US010669882B2

United States Patent
Nakayama et al.

(10) Patent No.: US 10,669,882 B2
(45) Date of Patent: Jun. 2, 2020

(54) VARIABLE STATOR BLADE OPERATING DEVICE

(71) Applicant: KAWASAKI JUKOGYO KABUSHIKI KAISHA, Kobe-shi, Hyogo (JP)

(72) Inventors: Kentaro Nakayama, Nishinomiya (JP); Koji Terauchi, Kobe (JP); Yusuke Sakai, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 88 days.

(21) Appl. No.: 15/773,280

(22) PCT Filed: Oct. 5, 2016

(86) PCT No.: PCT/JP2016/004478
§ 371 (c)(1),
(2) Date: May 3, 2018

(87) PCT Pub. No.: WO2017/077684
PCT Pub. Date: May 11, 2017

(65) Prior Publication Data
US 2018/0328219 A1 Nov. 15, 2018

(30) Foreign Application Priority Data
Nov. 4, 2015 (JP) .................. 2015-216589

(51) Int. Cl.
*F01D 17/16* (2006.01)
*F04D 29/56* (2006.01)
*F02C 7/042* (2006.01)

(52) U.S. Cl.
CPC ......... *F01D 17/162* (2013.01); *F04D 29/563* (2013.01); *F02C 7/042* (2013.01);
(Continued)

(58) Field of Classification Search
CPC ...... F01D 17/162; F04D 29/563; F02C 7/042; F05D 2240/12; F05D 2260/50; F05D 2300/501
See application file for complete search history.

(56) References Cited

U.S. PATENT DOCUMENTS

| 4,867,635 A * | 9/1989 | Tubbs ................... F01D 17/162 415/159 |
| 5,035,572 A * | 7/1991 | Popp ..................... F01D 17/162 415/12 |

(Continued)

FOREIGN PATENT DOCUMENTS

| JP | 2004-124797 A | 4/2004 |
| JP | 2013-096341 A | 5/2013 |

OTHER PUBLICATIONS

International Search Report for PCT/JP2016/004478 dated Dec. 27, 2016 [PCT/ISA/210].

*Primary Examiner* — Igor Kershteyn
(74) *Attorney, Agent, or Firm* — Sughrue Mion, PLLC (57) ABSTRACT

A variable stator blade operating device is a variable stator blade operating device that manipulates the mounting angle of a stator blade of an axial compressor. The variable stator blade operating device includes: an arm which is connected to the stator blade; a rotating ring which is connected to one end of the arm and is externally fitted to a casing of the compressor with an interval between the rotating ring and an outer wall of the casing; a drive mechanism which turns the stator blade via the arm by rotating the rotating ring; and a plurality of elastic bodies arranged in the circumferential direction around the casing, between the rotating ring and the outer wall of the casing. Each of the plurality of elastic bodies is mounted to one of the rotating ring and the outer wall of the casing and contacts the other to energize the rotating ring radially outward.

6 Claims, 5 Drawing Sheets

(52) U.S. Cl.
CPC ...... *F05D 2240/12* (2013.01); *F05D 2260/50* (2013.01); *F05D 2300/501* (2013.01)

(56) References Cited

U.S. PATENT DOCUMENTS

| | | | | |
|---|---|---|---|---|
| 5,549,448 | A * | 8/1996 | Langston | F01D 17/162 29/889.2 |
| 7,588,415 | B2 * | 9/2009 | Giaimo | F01D 11/001 415/160 |
| 7,677,866 | B2 * | 3/2010 | Bromann | F01D 17/162 415/160 |
| 8,235,655 | B1 * | 8/2012 | Pankey | F01D 17/162 415/160 |
| 8,591,173 | B2 * | 11/2013 | Bouru | F01D 17/16 415/149.4 |
| 2005/0106010 | A1 * | 5/2005 | Evans | F01D 17/162 415/160 |
| 2007/0292264 | A1 * | 12/2007 | Bouru | F01D 17/162 415/159 |
| 2013/0108415 | A1 | 5/2013 | Hashimoto et al. | |
| 2014/0093362 | A1 | 4/2014 | Pickens | |
| 2014/0314540 | A1 * | 10/2014 | Do | F02C 9/20 415/1 |

* cited by examiner

FIG.1

VARIABLE STATOR BLADE OPERATING DEVICE

This application is a National Stage of International Application No. PCT/JP2016/004478 filed Oct. 5, 2016, claiming priority based on Japanese Patent Application No. 2015-216589 filed Nov. 4, 2015.

TECHNICAL FIELD

The present invention relates to a variable stator blade operating device that changes the mounting angle (angle of attack) of a variable stator blade provided in an axial compressor.

BACKGROUND ART

A gas turbine engine is a prime mover including as a basic configuration a compressor which sucks and compresses air to increase the pressure of the air, a combustor which burns fuel with the compressed air to produce high-temperature and high-pressure gas, and a turbine which intensely hits the high-temperature and high-pressure gas against an impeller to rotate the impeller. The prime mover takes power from the turbine.

An axial compressor of the gas turbine engine is a type of a compressor in which air flows in parallel to an axis of rotation and which generally includes a plurality of rows of rotor blades provided on the outer circumferential surface of a rotating body, and a plurality of rows of stator blades provided on the inner circumferential surface of a casing. In such a compressor, by action of the stator blades and the rotor blades which rotate relative to the stator blades, air can be sucked and the sucked air can be compressed to increase the pressure.

The compressor having the above configuration may be configured to appropriately set the angles of attack of the rotor blades by changing the mounting angles of a guide blade at an inlet and the mounting angles of the stator blades on first several rows, in accordance with the flow of air. In addition, it is proposed that the mounting angles of stator blades and the angles of attack of rotor blades are appropriately changed also in the turbine in a manner similar to that in the compressor. For example, PTL 1 discloses a turbine including this type of variable stator blade operating device.

The variable stator blade operating device disclosed in PTL 1 includes a casing that causes the front end portion of a shaft of each variable stator blade to penetrate the casing such that the casing supports the front end portion, an operation lever that is mounted to the front end portion of the shaft of each variable stator blade, a rotating ring that has a diameter slightly greater than that of the casing, a pin that causes each operation lever to be pivotally supported on the rotating ring, and an actuator that rotates the rotating ring. The variable stator blade operating device further includes a plurality of elastic bodies arranged at equal intervals in the circumferential direction between the rotating ring and the casing. A front end of an alignment bolt penetrating the rotating ring in the radial direction is engaged with the outer surface of each elastic body, and the inside of each elastic body is pressed against the casing.

CITATION LIST

Patent Literature

PTL 1: JP 2004-124797 A

SUMMARY OF INVENTION

Technical Problem

It is known that in the compressor or the turbine as described above, a difference in thermal elongation occurs between the casing and the rotating ring. For example, it is said that a thermal elongation difference of a few millimeters occurs in the turbine and a thermal elongation difference of a few tenths of a millimeter occurs in the compressor. Such a misalignment may cause the mounting angle of the stator blade to deviate from an appropriate value or to vary among the plurality of stator blades.

In the variable stator blade operating device disclosed in PTL 1, a difference in thermal elongation between the casing and the rotating ring is absorbed by elastic deformation of the elastic bodies disposed between the rotating ring and the casing. As described above, the thermal elongation difference in the turbine is significantly greater than that in the compressor. That is, even though it is necessary to cope with the thermal elongation difference in the compressor, being able to cope with a thermal elongation difference that is smaller than that in the turbine is enough. Therefore, in the compressor, a complicated structure for coping with a great thermal elongation difference is not required unlike in the turbine. Rather, a simple and compact structure which can cope with a relatively small thermal elongation difference is required.

The present invention has been made in view of the above circumstances, and an object of the present invention is to provide a variable stator blade operating device which suppresses misalignment of a rotating ring and a casing with a simple structure which can be made compact.

Solution to Problem

A variable stator blade operating device according to one aspect of the present invention is a variable stator blade operating device that manipulates a mounting angle of a stator blade of an axial compressor. The variable stator blade operating device includes:

an arm which is connected to the stator blade;

a rotating ring which is connected to one end of the arm and is externally fitted to a casing of the axial compressor with an interval between the rotating ring and an outer wall of the casing;

a drive mechanism which turns the stator blade via the arm by rotating the rotating ring; and a plurality of elastic bodies which is arranged in a circumferential direction around the casing, between the rotating ring and the outer wall of the casing.

Each of the plurality of elastic bodies is mounted to one of the rotating ring and the outer wall of the casing and contacts the other to energize the rotating ring radially outward.

According to the variable stator blade operating device described above, when the plurality of elastic bodies is elastically deformed between the casing and the rotating ring upon assembly, the rotating ring is aligned with respect to the casing, and mechanical backlash does not occur. In addition, a difference in thermal elongation between the rotating ring and the casing can be absorbed by the plurality of elastic bodies provided between the casing and the rotating ring. Furthermore, when the rotating ring rotates, the plurality of elastic bodies slides on the rotating ring or the outer wall of the casing. Therefore, turning of the rotating ring is guided. As described above, due to the simple structure which can be made compact, it is possible to eliminate mechanical backlash between the casing and the rotating ring and to cope with thermal elongation.

In the variable stator blade operating device described above, one axial end portion of each of the plurality of elastic bodies may protrude from the rotating ring.

As a result, the connecting portion between the rotating ring and the elastic body and the contact portion between the casing and the elastic body, or the contact portion between the rotating ring and the elastic body and the connecting portion between the casing and the elastic body are shifted from each other in the axial direction of the axial compressor. Therefore, it is easy to assemble and perform maintenance of the variable stator blade operating device.

In the variable stator blade operating device described above, at least a portion of each of the plurality of elastic bodies that is in contact with the rotating ring or the outer wall of the casing may be made of a self-lubricating material.

As a result, friction between the casing or the rotating ring and the elastic body is reduced, and the load applied to the rotating ring by the drive mechanism is smoothly converted into rotary motion.

In the variable stator blade operating device described above, the outer wall of the casing may have a circumferential protrusion that is continuous in the circumferential direction, and the plurality of elastic bodies may be mounted to or in contact with the outer circumferential surface of the circumferential protrusion.

As described above, since the outer circumferential surface of the circumferential protrusion is continuous in the circumferential direction and the rotating ring is also continuous in the circumferential direction, high accuracy is not required for positioning in the circumferential direction of the plurality of elastic bodies mounted to one of the outer circumferential surface of the circumferential protrusion and the rotating ring.

The variable stator blade operating device described above may further include a spacer interposed between at least one of the plurality of elastic bodies and the rotating ring.

Therefore, it is possible to align the rotating ring with the casing by using the spacer, which facilitates alignment work.

Advantageous Effects of Invention

According to the variable stator blade operating device according to the present invention, it is possible to suppress misalignment of the rotating ring and the casing with a relatively simple structure which can be made compact.

DESCRIPTION OF EMBODIMENTS

Figure 1:
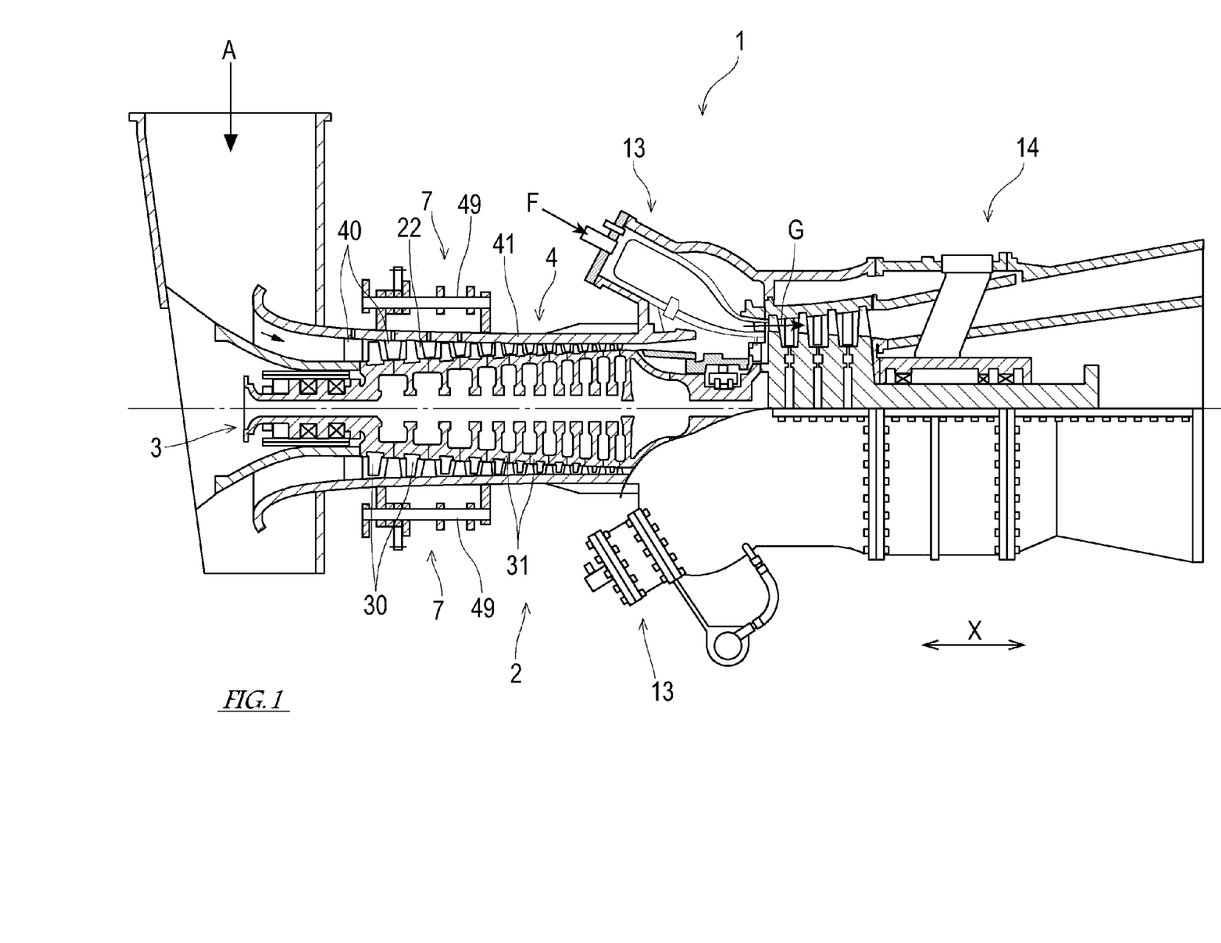
FIG. 1 is a schematic side view illustrating a gas turbine engine adopting a variable stator blade operating device according to an embodiment of the present invention, part of which is broken.

Hereinafter, a preferred embodiment of the present invention will be explained with reference to the drawings. First, with reference to FIG. 1, a schematic configuration of a gas turbine engine 1 adopting a variable stator blade operating device (hereinafter sometimes simply referred to as an "operating device 7") according to one embodiment of the present invention will be described. FIG. 1 is a schematic side view of the gas turbine engine 1 part of which is broken to illustrate an internal structure thereof.

The gas turbine engine 1 includes an axial compressor (hereinafter simply referred to as a "compressor 2"), a combustor 13, and a turbine 14 as basic components. In the gas turbine engine 1, the compressor 2 sucks and compresses air A, and the combustor 13 combusts fuel F by using the compressed air introduced from the compressor 2 to generate high-temperature and high-pressure combustion gas G. Then, the turbine 14 is driven by the energy of the high-temperature and high-pressure combustion gas G. Rotors of the compressor 2 and the turbine 14 are connected to each other. Loads such as the compressor 2 and a generator, not illustrated, are driven by the rotary power of the turbine 14.

Next, the compressor 2 will be described in detail. The compressor 2 has a double cylindrical structure including an outer stator 4 and an inner rotor 3 and extending in the axial direction of the compressor 2 (hereinafter simply referred to as an "axial direction X"). Between the rotor 3 and the stator 4, a compression passage 22 for compressing the sucked air A is formed.

The stator 4 is generally configured of a casing 41 and a plurality of stator blade rows aligned in the axial direction X on the inner circumferential surface of the casing 41. Each stator blade row is formed of a plurality of stator blades 40 arranged at equal intervals in the circumferential direction.

The rotor 3 is generally configured of a plurality of rotor disks 31 aligned in the axial direction X, and a plurality of rotor blades 30 arranged at equal intervals in the circumferential direction at the outer circumferential edge of each rotor disk 31. A rotor blade row is formed of the plurality of rotor blades 30 arranged in the circumferential direction. A plurality of rotor blade rows is aligned in the axial direction X. The stator blade rows and the rotor blade rows are alternately arranged in the axial direction X.

Some of the stator blades 40 are variable stator blades whose mounting angles are variable. The compressor 2 includes an operating device 7 which manipulates the mounting angles of the variable stator blades. In the compressor 2 according to the present embodiment, the stator blades 40 on the first to fourth rows from an inlet of the air A are configured to be variable stator blades. The stator blade 40 on the first row from the inlet of the air A may be referred to as a guide blade (guide vane) in some cases.

Figure 2:
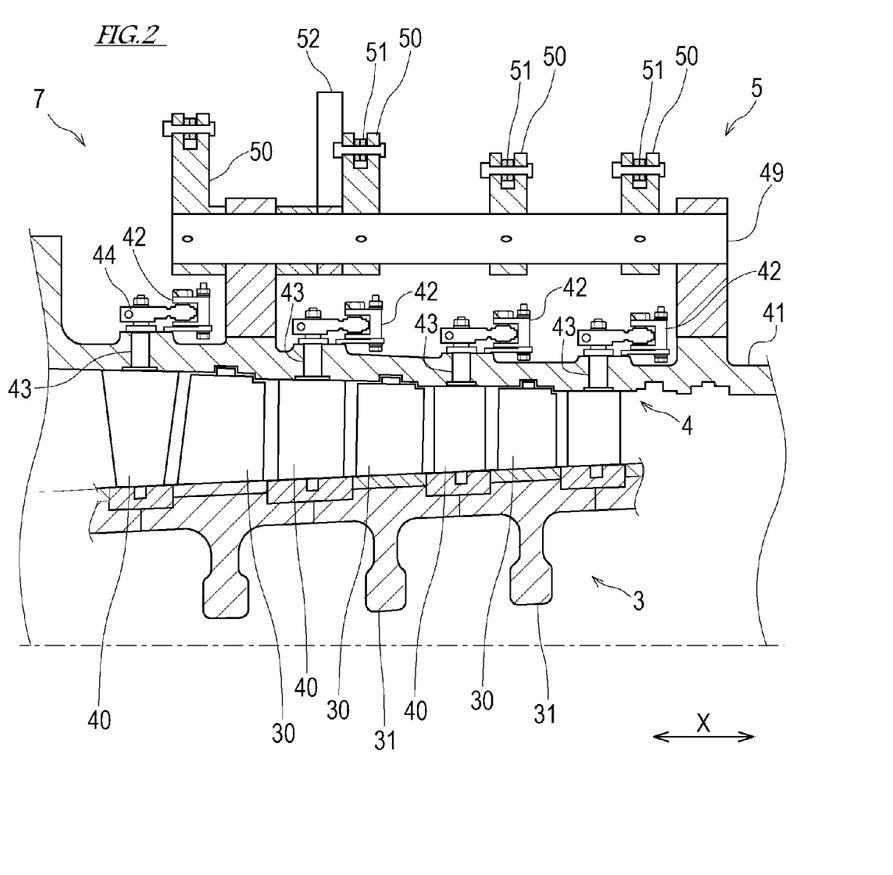
FIG. 2 is a partial cross-sectional view of a compressor for explaining a schematic configuration of the variable stator blade operating device.
Figure 3:
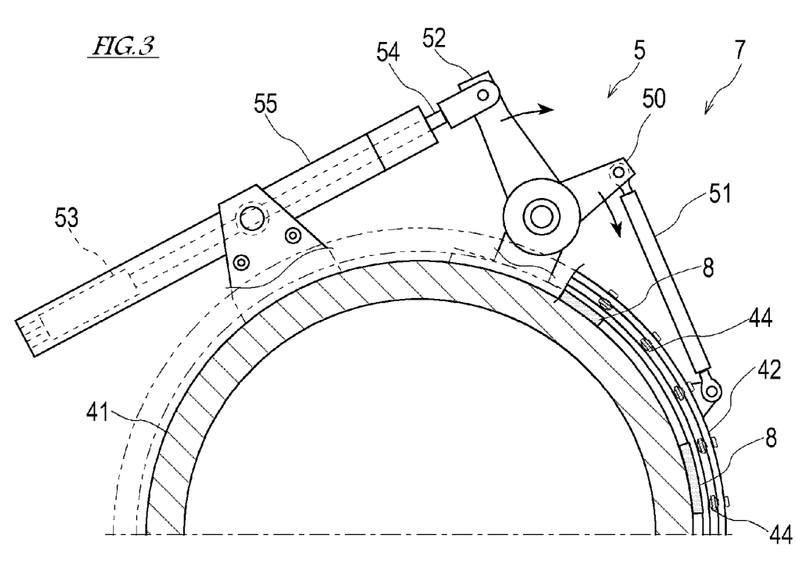
FIG. 3 is a view of the variable stator blade operating device viewed from the axial direction of the compressor.
Figure 4:
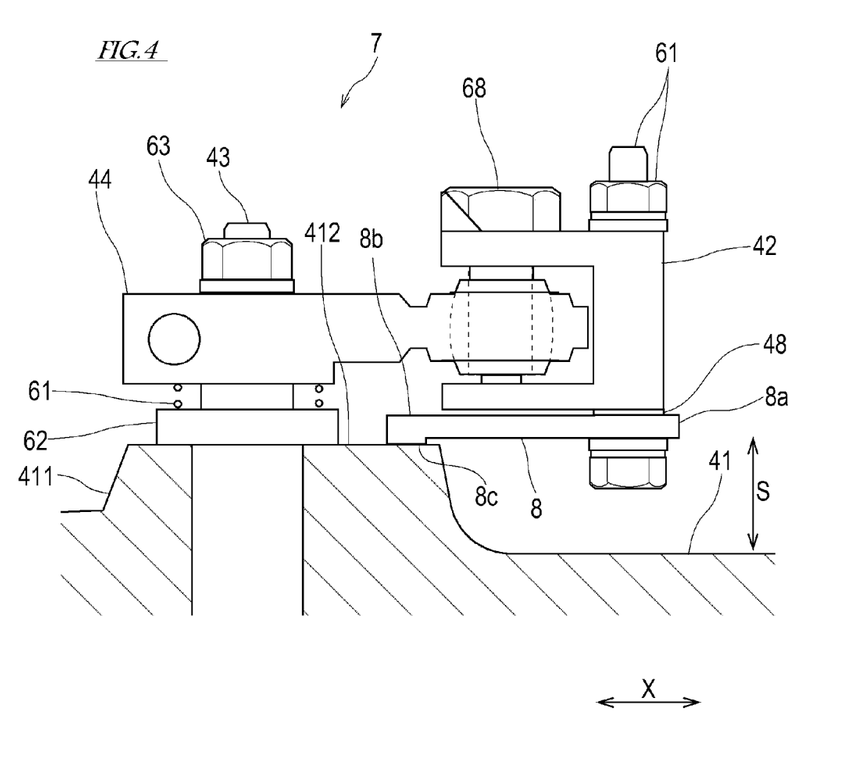
FIG. 4 is a partial detail view of FIG. 2.
Figure 5:
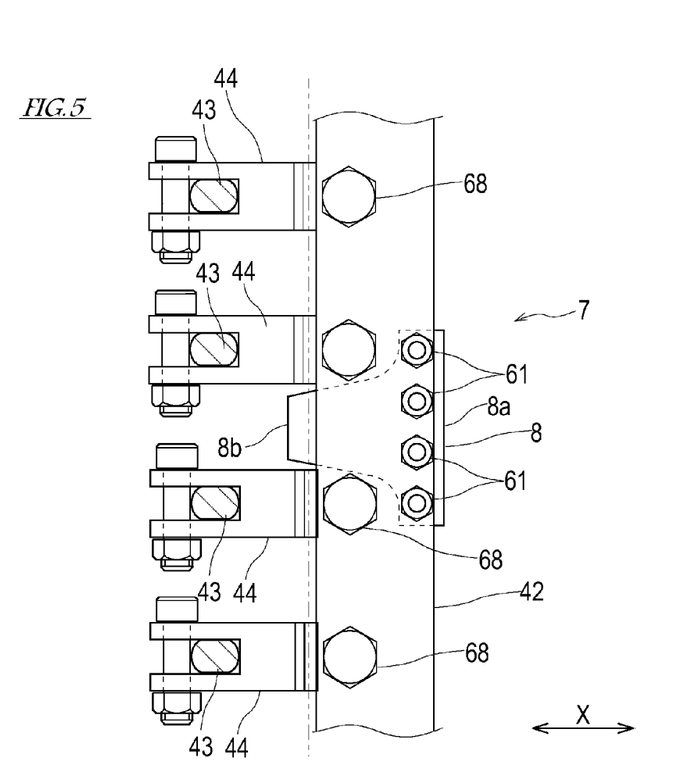
FIG. 5 is a view of part of the variable stator blade operating device including a rotating ring and an elastic body, as viewed from the radial outside of the compressor.

Subsequently, the variable stator blade and the operating device 7 for the variable stator blade will be described in detail. FIG. 2 is a partial cross-sectional view of the compressor 2 for explaining a schematic configuration of the variable stator blade operating device 7. FIG. 3 is a view of the variable stator blade operating device 7 viewed from the axial direction of the compressor 2. FIG. 4 is a partial detail view of FIG. 2. FIG. 5 is a view of part of the variable stator blade operating device 7 including a rotating ring 42 and an elastic body 8, as viewed from the radial outside of the compressor 2.

As illustrated in FIGS. 2 and 4, a blade shaft 43 is integrally connected to the stator blade 40 which is a variable stator blade. The blade shaft 43 penetrates the casing 41 in a radial direction, and the front end of the blade shaft 43 protrudes from the outer wall of the casing 41. When the blade shaft 43 turns about the axis thereof, the mounting angle of the stator blade 40 changes.

A spring seat 62, a spring body 61, and a base end portion of an arm 44 are sequentially fitted to a protruding end of the blade shaft 43 from the casing 41, and are prevented from coming off by a nut 63. The spring body 61 interposed between the base end portion of the arm 44 and the casing 41 energizes the arm 44 such that the axial direction of the blade shaft 43 is substantially orthogonal to the extending direction of the arm 44. In addition, part of the blade shaft 43 into which the arm 44 is fitted has a detent shape, and the arm 44 rotates integrally with the blade shaft 43 and the stator blade 40 about the axis of the blade shaft 43.

On the outer circumferential side of the casing 41, the annular rotating ring 42 is provided correspondingly to each row of the variable stator blades. In the present embodiment, the four rotating rings 42 aligned in the axial direction X of the compressor 2 are provided on the outer circumferential side of the casing 41. The rotating ring 42 is externally fitted to the casing 41 with an interval between the rotating ring 42 and the outer wall of the casing 41.

Each of the front end portions of the plurality of arms 44 corresponding to one row of the variable stator blades is connected to one rotating ring 42. More specifically, the cross-sectional shape of the rotating ring 42 is a C-shape. The front end portion of the arm 44 is fitted into the opening of the C-shape. A shaft member 68 penetrates the rotating ring 42 and the front end portion of the arm 44.

The rotating ring 42 is driven to turn by the drive mechanism 5. When the rotating ring 42 on a certain row turns along the outer circumference of the casing 41, the plurality of arms 44 connected to this rotating ring 42 is synchronously operated. As a result, the stator blades 40 on that row rotate synchronously about the corresponding blade shaft 43, and thus the mounting angles of the stator blades 40 change. The drive mechanism 5 of the operating device 7 according to the present embodiment is configured so as to drive all the rotating rings 42 in conjunction with one another in order to simultaneously change the mounting angles of the four rows of variable stator blades provided in the compressor 2. The specific configuration of the drive mechanism 5 will be described below.

As illustrated in FIGS. 1 to 3, an interlocking shaft 49 extending in parallel to the axial direction X of the compressor 2 is supported on the outer wall of the casing 41. The interlocking shaft 49 is provided with four operating levers 50 rotating integrally with the interlocking shaft 49. The rotating ring 42 is connected to each operating lever 50 via a rod 51. In addition, the interlocking shaft 49 is provided with a driving lever 52 which rotates integrally with the interlocking shaft 49. An actuator for rotationally driving the driving lever 52 is connected to the driving lever 52. The actuator according to the present embodiment includes a motor 53 (or a hydraulic unit) which is a drive source, a cylinder 55, and a rod 54 which is driven by the motor 53 and reciprocates from the cylinder 55. The front end of the rod 54 is connected to the driving lever 52, and the cylinder 55 is supported on the outer wall of the casing 41.

In the above-described configuration, when the motor 53 is actuated and the rod 54 reciprocates, the driving lever 52 and each operating lever 50 rotate about the interlocking shaft 49. As a result, the four rotating rings 42 rotate simultaneously. Therefore, the stator blades 40 in each row connected to each rotating ring 42 are interlocked with one another, and the mounting angles of the stator blades 40 change simultaneously.

Note that the length of each rod 51 is adjustable, and the angle of the operating lever 50 can be adjusted by changing the length of the rod 51. In addition, all the mounting angles of the stator blades 40 on one row connected to one rotating ring 42 are changed by an identical angle. Change angles of the mounting angles of the stator blades 40 which are variable stator blades may be different for each row. For example, the lever ratios of the driving levers 52 or the like may be appropriately adjusted such that the change angle of the stator blade 40 on a row farther from the front is smaller.

Incidentally, the casing 41 and the rotating ring 42 differ from each other in thermal elongation during operation of the compressor 2. More specifically, the casing 41 thermally stretches more than the rotating ring 42 does. In order to suppress misalignment between the casing 41 and the rotating ring 42 due to such a difference in thermal elongation, the compressor 2 according to the present embodiment has a structure to be described below.

As illustrated in FIG. 4, a portion of the casing 41 through which the plurality of blade shafts 43 of each row is inserted and a peripheral portion of the above portion form a circumferential protrusion 411 (annular rib) continuous in the circumferential direction. The outer circumferential surface of the circumferential protrusion 411 is a circumferential protruding surface 412 located radially outward of the normal outer wall surface of the casing 41. The arm 44 fitted to the blade shaft 43 protruding radially outward with respect to the circumferential protrusion 411 is located on the outer circumferential side (that is, the outside in the radial direction of the compressor 2) with respect to the circumferential protruding surface 412. The rotating ring 42 connected to the arm 44 is located on the outer circumferential side with respect to the circumferential protruding surface 412. The position of the rotating ring 42 in the axial direction X of the compressor 2 is shifted from the circumferential protrusion 411 in the axial direction X. Thus, the inner circumference of the rotating ring 42 and the normal outer wall surface of the casing 41 are separated from each other in the radial direction.

In addition, as illustrated in FIGS. 3 to 5, the compressor 2 has the elastic bodies 8 mounted to a plurality of locations on the inner circumferential surface of the rotating ring 42. The elastic bodies 8 are in contact with the outer wall of the casing 41. Each elastic body 8 is a metal thin plate, that is, a so-called leaf spring, and is elastically deformable. In the present embodiment, the eight or more elastic bodies 8 are arranged at equal intervals on (equally divide) the inner circumferential surface of the rotating ring 42 in a well-balanced manner.

One end portion 8a of the elastic body 8 in the axial direction X of the compressor 2 is mounted to the rotating ring 42 by a fastener 81 configured of a bolt and a nut. Since the elastic body 8 is fastened to the rotating ring 42 as described above, the elastic body 8 can be easily replaced with a new elastic body 8 when fatigue of the elastic body 8 occurs.

A sliding surface 8c is provided at the other end portion 8b of the elastic body 8 in the axial direction X of the compressor 2. The sliding surface 8c is in contact with the circumferential protruding surface 412 of the casing 41. Therefore, when the rotating ring 42 turns around the casing 41, the end portion 8b of the elastic body 8 rotates integrally with the rotating ring 42 while the end portion 8b of the elastic body 8 slides on the circumferential protruding surface 412 of the casing 41.

The elastic body 8 is configured such that at least the sliding surface 8c, which is a portion in contact with the outer wall of the casing 41, is made of a self-lubricating material. That is, the elastic body 8 may be a composite body formed of the sliding surface 8c made of a self-lubricating material, and the other part made of a metal such as steel, iron, stainless steel, or the like. Examples of the above-described "self-lubricating material" include a material obtained by dispersing a solid lubricant in a base metal containing a soft metal such as copper having seizure preventing effect and sintering the base metal in which the solid lubricant is dispersed, a material obtained by embedding a solid lubricant in the above-described base metal, and a material obtained by subjecting one of the above-described materials to oil impregnation treatment. The solid lubricant may be, for example, graphite, which is high-temperature resistant, among materials forming a coating film having a low shearing force on a friction surface. In addition, it is preferable that the friction coefficient of the "self-lubricating material" described above is sufficiently low, and a friction coefficient $\mu$ between the sliding surface 8c of the elastic body 8 and the outer wall surface of the casing 41 is 0.2 or less. As described above, since the sliding surface 8c of the elastic body 8 is self-lubricating, friction between the sliding surface 8c of the elastic body 8 and the protruding surface of the casing 41 is reduced.

When the compressor 2 is assembled, the rotating ring 42 to which the elastic bodies 8 are mounted in advance is assembled to the casing 41. Here, the elastic body 8 is arranged such that the sliding surface 8c of the elastic body 8 contacts the circumferential protruding surface 412 of the outer wall of the casing 41. The plurality of elastic bodies 8 arranged at equal intervals in the circumferential direction between the casing 41 and the rotating ring 42 are elastically deformed so as to energize the rotating ring 42 radially outward, and elastic deformation amounts of the plurality of elastic bodies 8 are balanced. As a result, the casing 41 and the rotating ring 42 are aligned such that the radial interval S between the casing 41 and the rotating ring 42 is within a predetermined range in the circumferential direction. Note that in a case where the casing 41 and the rotating ring 42 are not aligned enough by using the plurality of elastic bodies 8, it is possible to insert a spacer 48 between the rotating ring 42 and the elastic bodies 8 so as to supplement alignment by the spacer 48. As the spacer 48, for example, it is desirable to use a shim plate or the like whose thickness can be adjusted.

As described above, the variable stator blade operating device 7 according to the present embodiment is a variable stator blade operating device that manipulates the mounting angle of the stator blade 40 of the compressor 2. The variable stator blade operating device 7 includes: the arm 44 which is connected to the stator blade 40; the rotating ring 42 which is connected to one end of the arm 44 and externally fitted to the casing 41 of the compressor 2 with an interval between the rotating ring 42 and the outer wall of the casing 41; the drive mechanism 5 which turns the stator blade 40 via the arm 44 by rotating the rotating ring 42; and the plurality of elastic bodies 8 arranged in the circumferential direction around the casing 41, between the rotating ring 42 and the outer wall of the casing 41. Each of the plurality of elastic bodies 8 is mounted to the rotating ring 42 and contacts the outer wall of the casing 41 to energize the rotating ring 42 radially outward.

According to the operating device 7 described above, when the rotating ring 42 turns, the plurality of elastic bodies 8 slides on the outer wall of the casing 41. As a result, the rotating ring 42 can turn without rattling around the casing 41 while maintaining the concentricity with the casing 41. By suppressing rattling, delay of the reaction time from when the operating device 7 is operated to when the mounting angle of the stator blade 40 is actually changed is reduced and quick operation of the operating device 7 is secured, which in turn contributes to expansion of the stable operation range of the gas turbine engine 1.

In addition, according to the operating device 7 described above, since the difference in thermal elongation between the casing 41 and the rotating ring 42 is absorbed by elastic deformation of the elastic bodies 8, misalignment between the casing 41 and the rotating ring 42 is suppressed. By suppressing the misalignment, an appropriate correspondence between the operation amount and the change amount of the mounting angle of the stator blade 40 is maintained, variation in change amount is reduced, and accurate operation of the operating device 7 is secured, which in turn contributes to maintaining of performance, stabilization of operation, and expansion of the stable operation range of the gas turbine engine 1.

Furthermore, according to the operating device 7 described above, only the plurality of elastic bodies 8 is required to be provided between the casing 41 and the rotating ring 42 in the radial direction. Therefore, simplification and miniaturization of the structure for absorbing the difference in thermal elongation is realized. As long as the plurality of elastic bodies 8 can cause the rotating ring 42 to be supported on the casing 41, high accuracy is not required for the shape of each of the elastic bodies 8 and the mounting positions of the elastic bodies 8 on the rotating ring 42. Therefore, after mounting the plurality of elastic bodies 8 to the rotating ring 42, the rotating ring 42 can be arranged around the casing 41. In addition, when the rotating ring 42 is disposed around the casing 41, the plurality of elastic bodies 8 is elastically deformed. Thus, alignment of the rotating ring 42 with respect to the casing 41 is performed semi-automatically. Therefore, high positioning accuracy is not required for assembling of the elastic bodies 8 and the rotating ring 42 to the casing 41, and alignment work is easy. As a result, assembly of the operating device 7 is easier than that in a conventional technique disclosed, for example, in PTL 1.

In the variable stator blade operating device 7 according to the embodiment described above, the one end portion 8a in the axial direction X of the compressor 2 of each of the plurality of elastic bodies 8 is mounted to the rotating ring 42, and the other end portion 8b in the axial direction X protrudes in the axial direction X with respect to the rotating ring 42. The protruding portion of the elastic body 8 is in contact with the outer wall of the casing 41.

According to the configuration described above, since the connecting portion between the rotating ring 42 and the elastic body 8 and the contact portion between the casing 41 and the elastic body 8 are shifted from each other in the axial direction X of the compressor 2, assembly and maintenance of the operating device 7 is easy.

In addition, in the variable stator blade operating device 7 according to the embodiment described above, at least a portion of each of the plurality of elastic bodies 8 in contact with the outer wall of the casing 41 (that is, the sliding surface 8c) is made of a self-lubricating material.

According to the above configuration, friction between the casing 41 and the elastic body 8 is reduced, and the load applied to the rotating ring 42 by the drive mechanism 5 is smoothly converted into rotary motion.

In addition, in the variable stator blade operating device 7 according to the embodiment described above, the outer wall of the casing 41 has the circumferential protrusion 411 that is continuous in the circumferential direction, and the plurality of elastic bodies 8 is in contact with the outer circumferential surface (that is, the circumferential protruding surface 412) of the circumferential protrusion 411.

According to the configuration described above, since the circumferential protruding surface 412 is continuous in the circumferential direction and the rotating ring 42 is also continuous in the circumferential direction, high accuracy is not required for positioning in the circumferential direction of the elastic bodies 8 mounted to the rotating ring 42. Therefore, when the elastic bodies 8 are mounted to the rotating ring 42 and when the rotating ring 42 is externally fitted to the casing 41, high accuracy is not required for positioning in the circumferential direction, and assembly of the operating device 7 is easy.

Note that in the embodiment described above, the circumferential protrusion 411 of the casing 41 with which the elastic bodies 8 are in contact also serves as a thick portion of the casing 41 supporting the blade shafts 43 of the stator blades 40. As described above, the existing configuration of the casing 41 can be used as the portion in contact with the elastic bodies 8, and the design change of the casing 41 can be reduced. Furthermore, the structure of the operating device 7 according to the present embodiment can be applied not only to a new compressor 2 but also to an existing compressor 2.

In addition, the variable stator blade operating device 7 according to the embodiment described above may further include a spacer 48 interposed between at least one of the plurality of elastic bodies 8 and the rotating ring 42.

According to the configuration described above, manufacturing errors of the rotating ring 42 and the elastic bodies 8 can be absorbed by the spacer 48. Therefore, high component accuracy is not required for the rotating ring 42 and the elastic bodies 8. In addition, it is possible to align the rotating ring 42 with the casing 41 by using the spacer 48, which facilitates alignment work.

Although the preferred embodiment of the present invention has been described above, the above configuration can be modified as follows, for example.

For example, the variable stator blade operating device 7 described above is applied to the compressor 2; however, the variable stator blade operating device 7 may be applied to an axial turbine having a similar variable stator blade.

In addition, for example, in the variable stator blade operating device 7 described above, the plurality of elastic bodies 8 is mounted to the rotating ring 42 and is in sliding contact with the outer wall of the casing 41. However, a configuration is possible in which a plurality of elastic bodies 8 is mounted to an outer wall of a casing 41 and is in sliding contact with the rotating ring 42. Also in this configuration, action and effect similar to those of the embodiment described above can be obtained. In this case, one end portion 8a of the elastic body 8 in the axial direction X is in contact with the rotating ring 42, and the other end portion 8b in the axial direction X protrudes in the axial direction X with respect to the rotating ring 42. The protruding portion of the elastic body 8 is mounted to an outer wall of the casing 41. Here, the elastic body 8 may be mounted to a circumferential protruding surface 412 of the casing 41. The portion of the elastic body 8 which is in contact with the rotating ring 42 becomes a sliding surface, and this portion is made of a lubricating material.

It is to be understood that the above description is to be construed as illustrative only of an embodiment of the present invention and is provided for the purpose of teaching those skilled in the art the best mode of carrying out the invention. It is possible to substantially change the details of the structure and/or function of the present invention without departing from the spirit of the present invention.

REFERENCE SIGNS LIST 1 gas turbine engine
2 compressor
3 rotor
4 stator
5 drive mechanism
7 variable stator blade operating device
8 elastic body
8a end portion
8b end portion
8c sliding surface
30 rotor blade
31 rotor disk
40 stator blade
41 casing
42 rotating ring
43 blade shaft
44 arm
48 spacer
411 circumferential protrusion
412 circumferential protruding surface

The invention claimed is:

1. A variable stator blade operating device manipulating a mounting angle of a stator blade of an axial compressor, the device comprising:
   an arm which is connected to the stator blade;
   a rotating ring which is connected to one end of the arm and is externally fitted to a casing of the axial compressor with an interval between the rotating ring and an outer wall of the casing;
   a drive mechanism which turns the stator blade via the arm by rotating the rotating ring; and
   a plurality of elastic bodies which is arranged in a circumferential direction around the casing, between the rotating ring and the outer wall of the casing,
   wherein each of the plurality of elastic bodies is mounted to one of the rotating ring and the outer wall of the casing and contacts another of the rotating ring and the outer wall of the casing to energize the rotating ring radially outward, and
   wherein one axial end portion of respective ones of the plurality of elastic bodies protrudes from the rotating ring.

2. The variable stator blade operating device according to claim 1, wherein at least a portion of the plurality of elastic bodies that is in contact with one of the rotating ring and the outer wall of the casing is made of a self-lubricating material.

3. The variable stator blade operating device according to claim 1, the device further comprising a spacer which is interposed between at least one of the plurality of elastic bodies and the rotating ring.

4. A variable stator blade operating device manipulating a mounting angle of a stator blade of an axial compressor, the device comprising:
   an arm which is connected to the stator blade;
   a rotating ring which is connected to one end of the arm and is externally fitted to a casing of the axial compressor with an interval between the rotating ring and an outer wall of the casing;
   a drive mechanism which turns the stator blade via the arm by rotating the rotating ring; and a plurality of elastic bodies which is arranged in a circumferential direction around the casing, between the rotating ring and the outer wall of the casing, wherein each of the plurality of elastic bodies is mounted to one of the rotating ring and the outer wall of the casing and contacts another of the rotating ring and the outer wall of the casing to energize the rotating ring radially outward, and wherein the outer wall of the casing has a circumferential protrusion that is continuous in the circumferential direction, and the plurality of elastic bodies is in one of a state of being in contact with an outer circumferential surface of the circumferential protrusion and a state of being mounted to the outer circumferential surface of the circumferential protrusion.

5. The variable stator blade operating device according to claim 4, wherein at least a portion of the plurality of elastic bodies that is in contact with one of the rotating ring and the outer wall of the casing is made of a self-lubricating material.

6. The variable stator blade operating device according to claim 4, the device further comprising a spacer which is interposed between at least one of the plurality of elastic bodies and the rotating ring.

* * * * *